(12) United States Patent
Tian

(10) Patent No.: US 9,681,154 B2
(45) Date of Patent: Jun. 13, 2017

(54) SYSTEM AND METHOD FOR DEPTH-GUIDED FILTERING IN A VIDEO CONFERENCE ENVIRONMENT

(71) Applicant: Dihong Tian, San Jose, CA (US)

(72) Inventor: Dihong Tian, San Jose, CA (US)

(73) Assignee: PATENT CAPITAL GROUP, San Jose, CA (US)

( * ) Notice: Subject to any disclaimer, the term of this patent is extended or adjusted under 35 U.S.C. 154(b) by 443 days.

(21) Appl. No.: 13/707,377

(22) Filed: Dec. 6, 2012

(65) Prior Publication Data

US 2014/0160239 A1   Jun. 12, 2014

(51) Int. Cl.
| | |
|---|---|
| H04N 13/02 | (2006.01) |
| H04N 9/80 | (2006.01) |
| H04N 19/82 | (2014.01) |
| H04N 7/15 | (2006.01) |
| H04N 19/61 | (2014.01) |
| H04N 19/117 | (2014.01) |
| H04N 19/136 | (2014.01) |
| H04N 19/182 | (2014.01) |
| H04N 19/33 | (2014.01) |
| H04N 19/86 | (2014.01) |
| H04N 21/2343 | (2011.01) |

(52) U.S. Cl.
CPC ............ *H04N 19/82* (2014.11); *H04N 7/152* (2013.01); *H04N 19/117* (2014.11); *H04N 19/136* (2014.11); *H04N 19/182* (2014.11); *H04N 19/33* (2014.11); *H04N 19/61* (2014.11); *H04N 19/86* (2014.11); *H04N 21/234327* (2013.01)

(58) Field of Classification Search
None
See application file for complete search history.

(56) References Cited

U.S. PATENT DOCUMENTS

| | | | |
|---|---|---|---|
| 2,911,462 A | 11/1959 | Brady | |
| 3,793,489 A | 2/1974 | Sank | |
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |

(Continued)

FOREIGN PATENT DOCUMENTS

| | | |
|---|---|---|
| CN | 101383925 A | 3/2009 |
| CN | 101953158 A | 1/2011 |

(Continued)

OTHER PUBLICATIONS

U.S. Appl. No. 13/106,002, filed May 12, 2011, entitled "System and Method for Video Coding in a Dynamic Environment," Inventor: Dihong Tian.

(Continued)

*Primary Examiner* — Hung Dang
(74) *Attorney, Agent, or Firm* — Patent Capital Group

(57) ABSTRACT

A method is provided in one example embodiment that includes generating a depth map that corresponds to a video image and filtering the depth map with the video image to create a filtered depth map. The video image can be filtered with the filtered depth map to create an image. In one example implementation, the video image is filtered using extended depth-guided filtering that is incorporated into a video encoding-decoding loop.

9 Claims, 5 Drawing Sheets

(56) References Cited

U.S. PATENT DOCUMENTS

| | | |
|---|---|---|
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| 6,763,226 B1 | 7/2004 | McZeal |
| 6,768,722 B1 | 7/2004 | Katseff et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,801,637 B2 | 10/2004 | Voronka et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |

(56) References Cited

U.S. PATENT DOCUMENTS

| | | |
|---|---|---|
| D555,610 S | 11/2007 | Yang et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| D602,453 S | 10/2009 | Ding et al. |
| 7,607,101 B1 | 10/2009 | Barrus |
| 7,616,226 B2 | 11/2009 | Roessler et al. |
| 7,620,202 B2 | 11/2009 | Fujimura et al. |
| 7,623,115 B2 | 11/2009 | Marks |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| 7,738,457 B2 | 6/2010 | Nordmark et al. |
| D626,102 S | 10/2010 | Buzzard et al. |
| D626,103 S | 10/2010 | Buzzard et al. |
| 7,813,724 B2 | 10/2010 | Gronner et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| 7,899,265 B1 | 3/2011 | Rostami |
| D636,359 S | 4/2011 | Buzzard et al. |
| D636,747 S | 4/2011 | Buzzard et al. |
| 7,920,158 B1 | 4/2011 | Beck et al. |
| D637,568 S | 5/2011 | Desai et al. |
| D637,569 S | 5/2011 | Desai et al. |
| D637,570 S | 5/2011 | Desai et al. |
| 8,000,559 B2 | 8/2011 | Kwon |
| 8,031,906 B2 | 10/2011 | Fujimura et al. |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| 8,289,363 B2 | 10/2012 | Buckler |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,374,456 B2 | 2/2013 | Vetro et al. |
| 8,436,888 B1 | 5/2013 | Baldino et al. |
| 8,588,758 B2 | 11/2013 | Ullrich |
| 8,614,735 B2 | 12/2013 | Buckler |
| 8,692,862 B2 | 4/2014 | N'Guessan |
| 8,699,457 B2 | 4/2014 | Venkataswami et al. |
| 8,723,914 B2 | 5/2014 | Mackie et al. |
| 8,786,631 B1 | 7/2014 | Collins |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0071430 A1 | 3/2005 | Kobayashi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |

(56) References Cited

U.S. PATENT DOCUMENTS

| | | | |
|---|---|---|---|
| 2006/0181607 | A1 | 8/2006 | McNelley et al. |
| 2006/0184497 | A1 | 8/2006 | Suzuki et al. |
| 2006/0233120 | A1 | 10/2006 | Eshel et al. |
| 2006/0256187 | A1 | 11/2006 | Sheldon et al. |
| 2006/0284786 | A1 | 12/2006 | Takano et al. |
| 2007/0039030 | A1 | 2/2007 | Romanowich et al. |
| 2007/0121353 | A1 | 5/2007 | Zhang et al. |
| 2007/0140337 | A1 | 6/2007 | Lim et al. |
| 2007/0206556 | A1 | 9/2007 | Yegani et al. |
| 2007/0217406 | A1 | 9/2007 | Riedel et al. |
| 2008/0077390 | A1 | 3/2008 | Nagao |
| 2008/0240237 | A1 | 10/2008 | Tian et al. |
| 2008/0240571 | A1 | 10/2008 | Tian et al. |
| 2008/0303901 | A1 | 12/2008 | Variyath et al. |
| 2009/0051756 | A1 | 2/2009 | Trachtenberg |
| 2009/0122867 | A1 | 5/2009 | Mauchly et al. |
| 2009/0207233 | A1 | 8/2009 | Mauchly et al. |
| 2009/0207234 | A1 | 8/2009 | Chen et al. |
| 2009/0244257 | A1 | 10/2009 | MacDonald et al. |
| 2009/0256901 | A1 | 10/2009 | Mauchly et al. |
| 2009/0322082 | A1 | 12/2009 | Wagoner |
| 2009/0324023 | A1 | 12/2009 | Tian et al. |
| 2010/0082557 | A1 | 4/2010 | Gao et al. |
| 2010/0123770 | A1 | 5/2010 | Friel et al. |
| 2010/0225732 | A1 | 9/2010 | De Beer et al. |
| 2010/0225735 | A1 | 9/2010 | Shaffer et al. |
| 2010/0283829 | A1 | 11/2010 | De Beer et al. |
| 2010/0302345 | A1 | 12/2010 | Baldino et al. |
| 2011/0037636 | A1 | 2/2011 | Alexander |
| 2011/0261050 | A1* | 10/2011 | Smolic et al. ............... 345/419 |
| 2011/0292044 | A1* | 12/2011 | Kim et al. ............... 345/419 |
| 2012/0163672 | A1* | 6/2012 | McKinnon ............... 382/106 |
| 2013/0002816 | A1* | 1/2013 | Hannuksela ............... G06T 9/00 348/43 |
| 2013/0077852 | A1* | 3/2013 | Chang et al. ............... 382/154 |
| 2013/0114884 | A1* | 5/2013 | Chen et al. ............... 382/154 |
| 2013/0286017 | A1* | 10/2013 | Marimon Sanjuan et al. ............... 345/427 |
| 2014/0205023 | A1* | 7/2014 | Girdzijauskas ...... H04N 19/597 375/240.27 |

FOREIGN PATENT DOCUMENTS

| | | |
|---|---|---|
| CN | 102067593 | 5/2011 |
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO 2007/106157 | 9/2007 |
| WO | WO 2007/123946 | 11/2007 |
| WO | WO 2007/123960 | 11/2007 |
| WO | WO2008/010929 | 1/2008 |
| WO | WO 2008/039371 | 4/2008 |
| WO | WO 2008/040258 | 4/2008 |
| WO | WO 2008/101117 | 8/2008 |
| WO | WO 2008/118887 | 10/2008 |
| WO | WO2009/088976 | 7/2009 |
| WO | WO 2009/102503 | 8/2009 |
| WO | WO 2009/120814 | 10/2009 |
| WO | WO 2010/059481 | 5/2010 |
| WO | WO 2010/096342 | 8/2010 |
| WO | WO 2010/104765 | 9/2010 |
| WO | WO 2010/132271 | 11/2010 |
| WO | WO 2011/138472 A1 * | 11/2011 ............... G06T 7/00 |
| WO | WO 2012/033716 | 3/2012 |
| WO | WO 2012/068008 | 5/2012 |
| WO | WO 2012/068010 | 5/2012 |
| WO | WO 2012/068485 | 5/2012 |
| WO | WO2013/096041 | 6/2013 |

OTHER PUBLICATIONS

U.S. Appl. No. 13/329,943, filed Dec. 19, 2011, entitled "System and Method for Depth-Guided Image Filtering in a Video Conference Environment," Inventor: Dihong Tian.

"3D Particles Experiments in AS3 and Flash CS3," [retrieved and printed on Mar. 18, 2010]; 2 pages; http://www.flashandmath.com/advanced/fourparticles/notes.html.

3G, "World's First 3G Video Conference Service with New TV Commercial," Apr. 28, 2005, 4 pages; http://www.3g.co.uk/PR/April2005/1383.htm.

Digital Video Enterprises, "DVE Eye Contact Silhouette," 1 page, © DVE 2008; http://www.dvetelepresence.com/products/eyeContactSilhouette.asp.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.

Joshua Gluckman and S.K. Nayar, "Rectified Catadioptric Stereo Sensors," 8 pages, retrieved and printed on May 17, 2010; http://cis.poly.edu/~gluckman/papers/cvpr00.pdf.

R.V. Kollarits, et al., "34.3: An Eye Contact Camera/Display System for Videophone Applications Using a Conventional Direct-View LCD," © 1995 SID, ISSNN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Trevor Darrell, "A Real-Time Virtual Mirror Display," 1 page, Sep. 9, 1998; http://people.csail.mit.edu/trevor/papers/1998-021/node6.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

Andersson, L., et al., "LDP Specification," Network Working Group, RFC 3036, Jan. 2001, 133 pages; http://tools.ietf.org/html/rfc3036.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arrington, Michael, "eJamming—Distributed Jamming," TechCrunch; Mar. 16, 2006; http://www.techcrunch.com/2006/03/16/ejamming-distributed-jamming/; 1 page.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.

Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.

(56) References Cited

OTHER PUBLICATIONS

Awduche, D., et al., "Requirements for Traffic Engineering over MPLS," Network Working Group, RFC 2702, Sep. 1999, 30 pages; http://tools.ietf.org/pdf/rfc2702.pdf.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.

Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.

Boros, S., "Policy-Based Network Management with SNMP," Proceedings of the EUNICE 2000 Summer School Sep. 13-15, 2000, p. 3.

Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.

Chan, Eric, et al., "Experiments on block-matching techniques for video coding," Multimedia Systems; 9 Springer-Verlag 1994, Multimedia Systems (1994) 2 pages 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.

Chen, Qing, et al., "Real-time Vision-based Hand Gesture Recognition Using Haar-like Features," Instrumentation and Measurement Technology Conference, Warsaw, Poland, May 1-3, 2007, 6 pages;http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Chien et al., "Efficient moving Object Segmentation Algorithm Using Background Registration Technique," IEEE Transactions on Circuits and Systems for Video Technology, vol. 12, No. 7, Jul. 2002, 10 pages.

Cisco: Bill Mauchly and Mod Marathe; UNC: Henry Fuchs, et al., "Depth-Dependent Perspective Rendering," Apr. 15, 2008; 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.

Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1 page.

Dornaika F., et al., "Head and Facial Animation Tracking Using Appearance-Adaptive Models and Particle Filters," Jun. 27, 2004; 20040627-20040602, Jun. 27, 2004, 22 pages; HEUDIASY Research Lab; http://eprints.pascal-network.org/archive/00001231/01/rtvhci_chapter8.pdf.

DVE Digital Video Enterprises, "DVE Tele-Immersion Room," [retrieved and printed on Feb. 5, 2009] http://www.dvetelepresence.com/products/immersion_room.asp; 2 pages.

Dynamic Displays, copyright 2005-2008 [retrieved and printed on Feb. 24, 2009] http://www.zebraimaging.com/html/lighting_display.html, 2 pages.

ECmag.com, "IBS Products," Published Apr. 2009; http://www.ecmag.com/index.cfm?fa=article&articleID=10065; 2 pages.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

eJamming Audio, Learn More; [retrieved and printed on May 27, 2010] http://www.ejamming.com/learnmore/; 4 pages.

Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

Freeman, Professor Wilson T., Computer Vision Lecture Slides, "6.869 Advances in Computer Vision: Learning and Interfaces," Spring 2005; 21 pages.

Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gluckman, Joshua, et al., "Rectified Catadioptric Stereo Sensors," 8 pages, retrieved and printed on May 17, 2010; http://cis.poly.edu/~gluckman/papers/cvpr00.pdf.

PCT Mar. 14, 2013 International Search Report and Written Opinion from International Application PCT/US2012/069111.

Kim, Jae Hoon et al., "New Coding Tools for Illumination and Focus Mismatch Compensation in Multiview Video Coding," IEEE

(56) References Cited

OTHER PUBLICATIONS

Transactions on Circuits and Systems for Video Technology, IEEE Service Center, Piscataway, NJ, US. vol. 17, No. 11, Nov. 1, 2007; 17 pages.
Hong, Min-Cheol, et al., "A Reduced Complexity Loop Filter Using Coded Block Pattern and Quantization Step Size for H.26L Video Coder," International Conference on Consumer Electronics, 2001 Digest of Technical Papers, ICCE, Los Angelos, CA, Jun. 19-21, 2001; 2 pages.
USPTO May 24, 2013 Non-Final Office Action from U.S. Appl. No. 13/329,943.
USPTO Aug. 24, 2013 Response to May 24, 2013 Non-Final Office Action from U.S. Appl. No. 13/329,943.
USPTO Sep. 19, 2013 Notice of Allowance from U.S. Appl. No. 13/329,943.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.
Gries, Dan, "3D Particles Experiments in AS3 and Flash CS3, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestra!: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.
Gundavelli, S., et al., "Proxy Mobile IPv6," Network Working Group, RFC 5213, Aug. 2008, 93 pages; http://tools.ietf.org/pdf/rfc5213.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
He, L., et al., "The Virtual Cinematographer: A Paradigm for Automatic Real-Time Camera Control and Directing," Proc. SIGGRAPH, Aug. 1996; http://research.microsoft.com/en-us/um/people/lhe/papers/siggraph96.vc.pdf; 8 pages.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Holographic Imaging, "Dynamic Holography for scientific uses, military heads up display and even someday HoloTV Using TI's DMD," [retrieved and printed on Feb. 26, 2009] http://innovation.swmed.edu/research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of cellular phenomena," SPIE vol. 2979, Feb. 2, 1997, pp. 733-740.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.
Klint, Josh, "Deferred Rendering in Leadwerks Engine," Copyright Leadwerks Corporation, Dec. 9, 2008; http://www.leadwerks.com/files/Deferred_Rendering_in_Leadwerks_Engine.pdf; 10 pages.
Kollarits, R.V., et al., "34.4: An Eye Contact Camera/Display System for Videophone Applications Using a Conventional Direct-View LCD," Society for Information Display, International Symposium 1996 Digest of Technical Papers, vol. XXVI, May 23, 1995, pp. 765-768; http://citeseerx.ist.psu.edu/viewdoc/download;jsessionid=47A1E7E028C26503975E633895D114-EC?doi=10.1.1.42.1772&rep=rep1&type=pdf.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages. http://fulfillment.umi.com/dissertations/b7afbcb56ba72fdb14d26dfccc6b470f/1291487062/3143800.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

(56) References Cited

OTHER PUBLICATIONS

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Lawson, S., "Cisco Plans TelePresence Translation Next Year," Dec. 9, 2008; http://www.pcworld.com/article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrl.
Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/Publications/miller05cvmp.pdf, 10 pages.
Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.
Minoru from Novo is the worlds first consumer 3D Webcam, Dec. 11, 2008; http://www.minoru3d.com; 4 pages.
Mitsubishi Electric Research Laboratories, copyright 2009 [retrieved and printed on Feb. 26, 2009], http://www.merl.com/projects/3dtv, 2 pages.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
National Training Systems Association Home—Main, Interservice/Industry Training, Simulation & Education Conference, Dec. 1-4, 2008; http://ntsa.metapress.com/app/home/main.asp?referrer=default; 1 page.

* cited by examiner

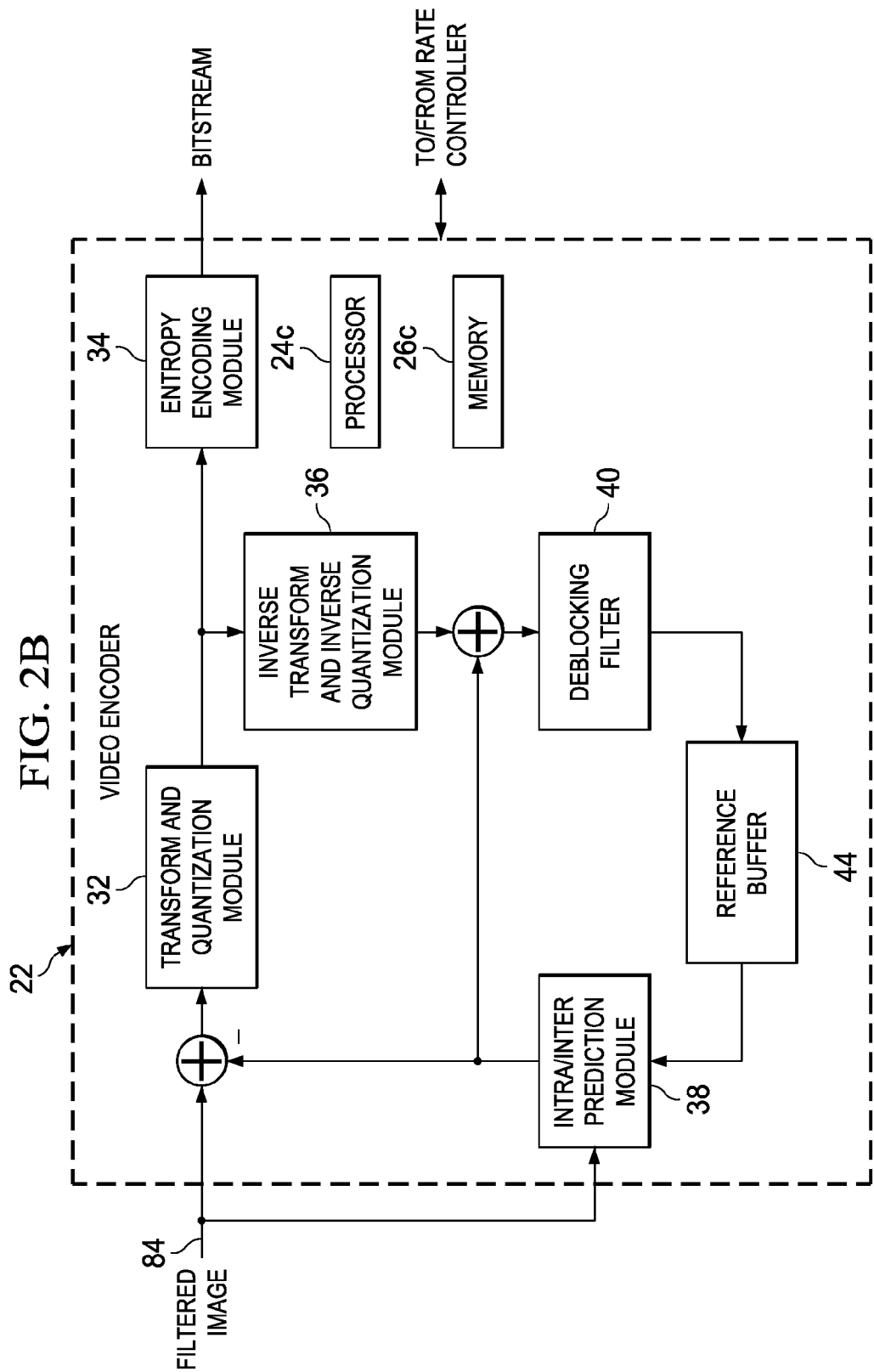

SYSTEM AND METHOD FOR DEPTH-GUIDED FILTERING IN A VIDEO CONFERENCE ENVIRONMENT

TECHNICAL FIELD

This disclosure relates in general to the field of communications, and more particularly, to a system and a method for depth-guided filtering in a video conference environment.

BACKGROUND

Video architectures have grown in complexity in recent times. Some video architectures can deliver real-time, face-to-face interactions between people using advanced visual, audio, and collaboration technologies. In certain architectures, service providers may offer sophisticated video conferencing services for their end users, which can simulate an "in-person" meeting experience over a network. The ability to enhance video encoding and decoding with certain bitrate constraints during a video conference presents a significant challenge to developers and designers, who attempt to offer a video conferencing solution that is realistic and that mimics a real-life meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2B is a simplified block diagram illustrating possible example details associated with one embodiment of the present disclosure;

DETAILED DESCRIPTION OF EXAMPLE EMBODIMENTS

Overview

A method is provided in one example embodiment that includes generating a depth map that corresponds to a video image and filtering the depth map with the video image to create a filtered depth map. The video image can be filtered with the filtered depth map to create an image. In one example implementation, the video image is filtered using extended depth-guided filtering that is incorporated into a video encoding-decoding loop.

In more detailed embodiments, the method may also include using the video image to create a pyramid of video images and using the depth map to create a pyramid of depth maps. The pyramid of video images may be combined with the pyramid of depth maps, layered into multiple bit streams, and cascaded to create the image. The term 'pyramid' in this context refers to any suitable combination, integration, formulation, arrangement, hierarchy, organization, composition, make-up, structure, format, or design associated with one or more video images. The method may further include using upsampling when the depth map has a lower resolution than the video image. The term 'upsampling' in this context simply refers to a process of increasing a sampling rate of a signal (by any suitable level).

In another example, filtering the depth map may include removing noise from the depth map. In yet another example, filtering the depth map may include filling in missing data from the depth map. The method may also include encoding the image into a bit stream for transmission over a network.

Example Embodiments

Figure 1:
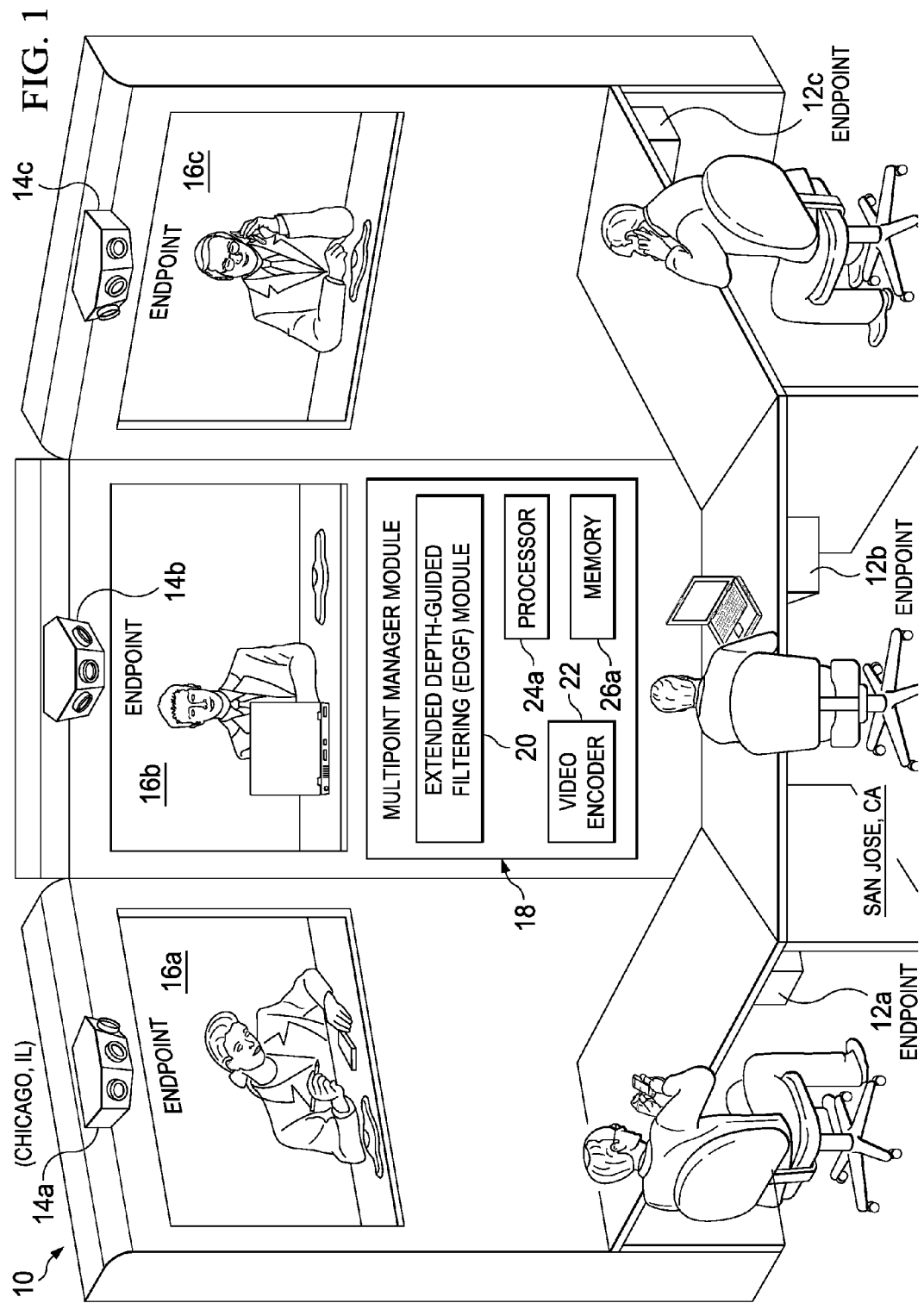
FIG. 1 is a simplified block diagram illustrating an example embodiment of a communication system in accordance with one embodiment of the present disclosure.

Turning to FIG. 1, FIG. 1 is a simplified schematic diagram illustrating a communication system 10 for conducting a video conference in accordance with one embodiment of the present disclosure. Communication system 10 includes a multipoint manager module 18 and multiple endpoints associated with various end users of the video conference. Multipoint manager module 18 includes an extended depth-guided filtering (EDGF) module 20, a video encoder 22, a processor 24a, and a memory 26a.

In general, endpoints may be geographically separated, where in this particular example, a plurality of endpoints 12a-12c are located in San Jose, Calif. and remote endpoints (not shown) are located in Chicago, Ill. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In this example, each endpoint 12a-12c is fitted discreetly along a desk and is proximate to its associated participant. Such endpoints could be provided in any other suitable location, as FIG. 1 only offers one of a multitude of possible implementations for the concepts presented herein. In one example implementation, the endpoints are videoconferencing endpoints, which can assist in receiving and communicating video and audio data. Other types of endpoints are certainly within the broad scope of the outlined concepts, and some of these example endpoints are further described below. Each endpoint 12a-12c is configured to interface with the multipoint manager module 18, which helps to coordinate and to process information being transmitted by the end users.

As illustrated in FIG. 1, a number of image capture devices 14a-14c and displays 16a-16c are provided to interface with endpoints 12a-12c, respectively. Displays 16a-16c render images to be seen by conference participants and, in this particular example, reflect a three-display design (e.g., a 'triple'). Note that as used herein in this Specification, the term 'display' is meant to connote any element that is capable of delivering image data (inclusive of video information), text, sound, audiovisual data, etc. to participants. This would necessarily be inclusive of any screen-cubes, panel, plasma element, television (which may be high-definition), monitor, computer interface, screen, Telepresence devices (inclusive of Telepresence boards, panels, screens, surfaces, etc.), or any other suitable element that is capable of delivering/rendering/projecting (from front or back) such information.

The components of communication system 10 may use specialized applications and hardware to create a system that can leverage a network. Communication system 10 can use standard IP technology and can operate on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

For purposes of illustrating certain example techniques of communication system 10, it is important to understand certain image processing techniques and the communications that may be traversing the network. The following foundational information may be viewed as a basis from which the present disclosure may be properly explained.

Conceptually, an image may be described as any electronic element (e.g., an artifact) that reproduces the form of a subject, such as an object or a scene. In many contexts, an image may be an optically formed duplicate or reproduction of a subject, such as a two-dimensional photograph of an object or scene. In a broader sense, an image may also include any two-dimensional representation of information, such as a drawing, painting, or map. A video is a sequence of images, in which each still image is generally referred to as a "frame."

A digital image, in general terms, is a numeric representation of an image. A digital image is most commonly represented as a set (rows and columns) of binary values, in which each binary value is a picture element (i.e., a "pixel"). A pixel holds quantized values that represent the intensity (or "brightness") of a given color at any specific point in the two-dimensional space of the image. A digital image can be classified generally according to the number and nature of those values (samples), such as binary, grayscale, or color. Typically, pixels are stored in a computer memory as a two-dimensional array of small integers (i.e., a raster image or a raster map).

An image (or video) may be captured by optical devices having a sensor that converts lights into electrical charges, such as a digital camera or a scanner, for example. The electrical charges can then be converted into digital values. Some digital cameras give access to almost all the data captured by the camera, using a raw image format. An image can also be synthesized from arbitrary non-image information, such as mathematical functions or three-dimensional geometric models.

Images from digital image capture devices often receive further processing to improve their quality and/or to reduce the consumption of resources, such as memory or bandwidth. For example, a digital camera frequently includes a dedicated digital image-processing unit (or chip) to convert the raw data from the image sensor into a color-corrected image in a standard image file format. Image processing in general includes any form of signal processing for which the input is an image, such as a photograph or video frame. The output of image processing may be either an image or a set of characteristics or parameters related to the image. Most image-processing techniques involve treating the image as a two-dimensional signal and applying standard signal-processing techniques to it.

Digital images can be coded (or compressed) to reduce or remove irrelevance and redundancy from the image data to improve storage and/or transmission efficiency. For example, general-purpose compression generally includes entropy encoding to remove statistical redundancy from data. However, entropy encoding is frequently not very effective for image data without an image model that attempts to represent a signal in a form that is more readily compressible. Such models exploit the subjective redundancy of images (and video). A motion model that estimates and compensates for motion can also be included to exploit significant temporal redundancy usually found in video.

An image encoder usually processes image data in blocks of samples. Each block can be transformed (e.g., with a discrete cosine transform) into spatial frequency coefficients. Energy in the transformed image data tends to be concentrated in a few significant coefficients; other coefficients are usually close to zero or insignificant. The transformed image data can be quantized by dividing each coefficient by an integer and discarding the remainder, typically leaving very few non-zero coefficients, which can readily be encoded with an entropy encoder. In video, the amount of data to be coded can be reduced significantly if the previous frame is subtracted from the current frame.

Digital image processing often also includes some form of filtering intended to improve the quality of an image, such as by reducing noise and other unwanted artifacts. Image noise can be generally defined as random variation of brightness or color information in images not present in the object imaged. Image noise is usually an aspect of electronic noise, which can be produced by the sensor and/or other circuitry of a capture device. Image noise can also originate during quantization. In video, noise can also refer to the random dot pattern that is superimposed on the picture as a result of electronic noise. Interference and static are other forms of noise, in the sense that they are unwanted, which can affect transmitted signals.

Smoothing filters attempt to preserve important patterns in an image, while reducing or eliminating noise or other fine-scale structures. Many different algorithms can be implemented in filters to smooth an image. One of the most common algorithms is the "moving average", often used to try to capture important trends in repeated statistical surveys. Noise filters, for example, generally attempt to determine whether the actual differences in pixel values constitute noise or real photographic detail, and average out the former while attempting to preserve the latter. However, there is often a tradeoff made between noise removal and preservation of fine, low-contrast detail that may have characteristics similar to noise. Other filters (e.g., a deblocking filter) can be applied to improve visual quality and prediction performance, such as by smoothing the sharp edges that can form between macroblocks when block-coding techniques are used.

Image textures can also be calculated in image processing to quantify the perceived texture of an image. Image texture data provides information about the spatial arrangement of color or intensities in an image or a selected region of an image. The use of edge detection to determine the number of edge pixels in a specified region helps determine a characteristic of texture complexity. After edges have been found, the direction of the edges can also be applied as a characteristic of texture and can be useful in determining patterns in the texture. These directions can be represented as an average or in a histogram. Image textures may also be useful for classification and segmentation of images. In general, there are two primary types of segmentation based on image texture: region-based and boundary-based. Region-based segmentation generally attempts to group or cluster pixels based on texture properties together, while boundary-based segmentation attempts to group or cluster pixels based on edges between pixels that come from different texture properties. Though image texture is not always a perfect measure for segmentation, it can be used effectively along with other measures, such as color, to facilitate image segmentation.

In 3-D imaging, an image may be accompanied by a depth map that contains information corresponding to a third dimension of the image: indicating distances of objects in the scene to the viewpoint. In this sense, depth is a broad term indicative of any type of measurement within a given image. Each depth value in a depth map can correspond to a pixel in an image, which can be correlated with other image data (e.g., intensity values). Depth maps may be used for virtual view synthesis in 3-D video systems (e.g., 3DTV, or for gesture recognition in human-computer interaction, for example, MICROSOFT KINECT).

From a video coding perspective, depth maps may also be used for segmenting images into multiple regions, usually along large depth discontinuities. Each region may then be encoded separately, with possibly different parameters. One example is segmenting each image into foreground and background in which foreground objects in closer proximity to the viewpoint are differentiated from background objects that are relatively far away from the viewpoint. Such segmentation can be especially meaningful for Telepresence and video conferencing, in which scenes comprise primarily meeting participants (i.e., people).

However, merely using depth maps for image segmentation does not fully exploit the information to enhance image coding. In general, pixels within a region have been treated equally after segmentation in coding: regardless of their locations in the region with respect to other regions. In the foreground-background case, for example, a block of pixels in a color image is encoded as either foreground or background, which lacks a fine grain approach for improving image coding using depth. Further, a depth map typically has a lower resolution and contains considerable noise and missing values, which may introduce artifacts if the depth map is directly used in depth-guided filtering.

In accordance with embodiments disclosed herein, communication system 10 can resolve the aforementioned issue (and potentially others) by providing depth-guided image filtering. More specifically, communication system 10 can provide a system and method for processing a sequence of images using depth maps that are generated to correspond to the images. Depth maps and texture data of images can be used to develop a filter, which can be applied to the images. Such a system and method may be particularly advantageous for a conferencing environment such as communication system 10, in which images are encoded under a bitrate constraint and transported over a network, but the filter may also be applied advantageously independent of image encoding.

At its most general level, the system and method described herein may include receiving an image and a depth map, such as from a 3-D camera, and filtering the image according to the depth map such that details in the image that correspond to depth discontinuity and intensity variation can be preserved while substantially reducing or eliminating noise in the image. When coupled with a video encoder, the image may be further filtered such that details of objects closer to a viewpoint are preserved preferentially over objects further away, which may be particularly useful when the bitrate for encoding the image is constrained. For a block-based video encoder such as H.264 or MPEG-4, for example, the filtering may operate to reduce coding artifacts, such as artifacts introduced by quantization errors. When coupled with a video encoder, depth-guided filtering may further operate to conceal errors from partial image corruption, such as might occur with data loss during transmission.

Before turning to some of the additional operations of communication system 10, a brief discussion is provided about some of the infrastructure of FIG. 1. Endpoint 12a may be used by someone wishing to participate in a video conference in communication system 10. The term "endpoint" is inclusive of devices used to initiate a communication, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 10. Endpoints 12a-c may also be inclusive of a suitable interface to the human user, such as a display, a keyboard, a touchpad, a remote control, or other terminal equipment. Endpoints 12a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In some embodiments, image capture devices may be integrated with an endpoint, particularly mobile endpoints.

In operation, multipoint manager module 18 can be configured to establish, or to foster a video session between one or more end users, which may be located in various other sites and locations. Multipoint manager module 18 can also coordinate and process various policies involving endpoints 12a-12c. In general, multipoint manager module 18 may communicate with endpoints 12a-12c through any standard or proprietary conference control protocol. Multipoint manager module 18 can include a switching component that determines which signals are to be routed to individual endpoints 12a-12c. Multipoint manager module 18 can also determine how individual end users are seen by others involved in the video conference. Furthermore, multipoint manager module 18 can control the timing and coordination of this activity. Multipoint manager module 18 can also include a media layer that can copy information or data, which can be subsequently retransmitted or simply forwarded along to one or more endpoints 12a-12c.

Endpoints 12a-c, image capture devices 14a-c, and multipoint manager module 18 are network elements that can facilitate the extended depth-guide filtering activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, endpoints 12a-c, image capture devices 14a-c, and/or multipoint manager module 18 include software to achieve (or to foster) the image processing activities discussed herein. This could include the implementation of instances of an EDGF module 20 at any appropriate location. Additionally, each of these elements can have an internal structure (e.g., a processor, a memory element, etc.) to facilitate some of the image processing operations described herein. In other embodiments, these activities may be executed externally to these elements, or included in some other network element to achieve the intended functionality. Alternatively, endpoints 12a-c, image capture devices 14a-c, and/or multipoint manager module 18 may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

Figure 2A:
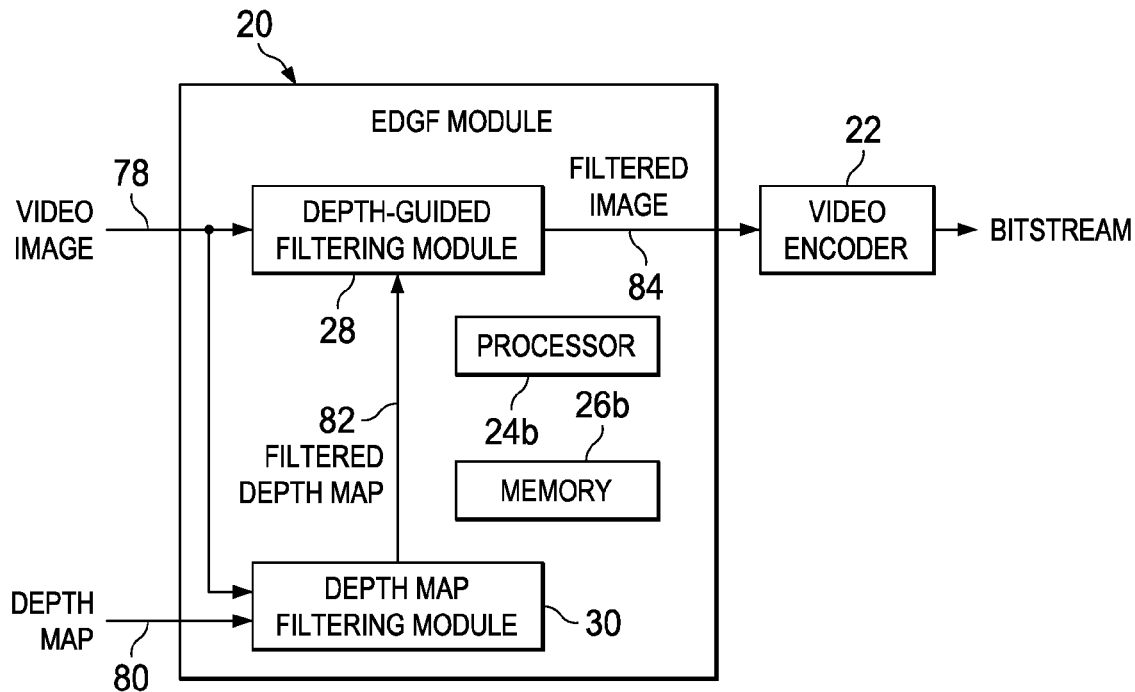
FIG. 2A is a simplified block diagram illustrating possible example details associated with one embodiment of the present disclosure.

Turning to FIG. 2A, FIG. 2A is a simplified block diagram illustrating additional details that may be associated with EDGF module 20. EDGF module 20 includes a depth-guided filtering module 28, a depth map filtering module 30, a processor 24b, and a memory 26b. In one example, a depth map 80 is generated to correspond to a video image 78. In this example, depth map 80 has a lower resolution than video image 78 and contains noise and missing depth values.

Depth-guided filtering module 28 can be configured to combine depth information with texture data and the depth-guided filtering can help reduce coding artifacts, such as those that can be introduced by quantization errors. The depth-guided filtering can be applied to an image after inverse transform and inverse quantization, deblocking filtering, and prediction compensation. Depth map filtering module 30 can be configured to filter depth map 80 using the higher-resolution video image 78 to create a filtered depth map 82. Filtered depth map 82 is then sent to depth-guided filtering module 28 where video image 80 is filtered using filtered depth map 82 to create a filtered image 84. The two filtering procedures may be performed sequentially, or they may be applied at once in a joint form on video image 78 using (unfiltered) depth map 80. Filtered image 84 may be sent to video encoder 22 for encoding into a bit stream.

In an embodiment, EDGF module 20 can be configured to account for original depth values that may be missing due to limitations at depth acquisition or that contain considerable noise. More specifically in equations one and two below, p is the central pixel to be filtered, and q is a neighboring pixel in a window S. $D_p$, $I_p$, and $D_q$, $I_q$ denote the depth and color intensity values of the two pixels, respectively. $G_k$, $G_d$, and $G_r$ are functions (e.g., Gaussian functions) of the corresponding distance measures, respectively. $W_p$ is a normalization factor.

$$EDGF(p) = \frac{1}{W_p}$$
$$\sum_{q \in S} G_k(\|p - q\|) \cdot G_d(\|f_l(D_p) - f_l(D_q)\|) \cdot G_r(\|I_p - I_q\|) \cdot I_q$$
Equation 1

$$W_p = \sum_{q \in S} G_k(\|p - q\|) \cdot G_d(\|f_l(D_p) - f_l(D_q)\|) \cdot G_r(\|I_p - I_q\|)$$
Equation 2

The filtering of the depth value at pixel p may take a similar form using corresponding color intensity values, as shown below in equations three and four.

$$f_l(D_p) = \frac{1}{K_p} \sum_{q \in T} H_k(\|p - q\|) \cdot H_d(\|D_p - D_q\|) \cdot H_r(\|I_p - I_q\|) \cdot D_q$$
Equation 3

$$K_p = \sum_{q \in T} H_k(\|p - q\|) \cdot H_d(\|D_p - D_q\|) \cdot H_r(\|I_p - I_q\|)$$
Equation 4

The filtering of depth values has two-fold implications. First, when the depth image has a lower resolution than the color image, the filtering includes upsampling such that a depth value is generated for every pixel in the color image. Second, it also embraces noise reduction so that a higher-quality depth map may be achieved.

Although the depth-guided filtering and the pre-filtering of the depth map may have similar parametric forms as presented above, they have different implications and are applied to achieve different goals. The pre-filtering of the depth map is to remove noise and generate, by interpolation, missing depth values, and hence increase the resolution and quality of the depth map. In short, it is for improving the objective quality of the depth map and bringing it closer to ground truth. On the other hand, the application of depth-guided filtering is primarily for improving the subjective quality of video images, especially when the images are going through a video encoder under bit-rate constraints.

Such a distinction would be reflected when determining functions $\{G_k, G_d, G_r\}$ and $\{H_k, H_d, H_r\}$ for the two filters. In depth-guided filtering, for example, $\{G_k, G_d, G_r\}$ may be zero-mean Gaussian functions with standard deviations selected such that in the filtered color image, more fine details are preserved where depth values are small while only strong edges are retained in areas that have large depth values. Alternatively, in pre-filtering a depth map, $\{H_k, H_d, H_r\}$ should be selected to preserve edges in the depth map even when two objects on either side of a depth discontinuity have similar color intensity and to prevent creating non-existing discontinuities on a (supposedly) smooth surface in the depth map, due to noise contained in the depth map and rich texture in the corresponding region in the color image.

In an embodiment, extended depth-guided filtering may be incorporated into a video encoding-decoding loop. In this instance, instead of operating as a stand-alone filter and having an explicit parametric form, the depth-guided filtering may take an indirect form and operate as a filter parameter controller (FPC) to existing in-loop filters. The in-loop filters may include a deblocking filter (DF) in H.264, and may also include other filters (e.g., Sample Adaptive Offset (SAO) and Adaptive Loop Filter (ALF) that have been introduced in the development of next-generation video coding standard, known as High Efficiency Video Coding (HEVC)).

Turning to FIG. 2B, FIG. 2B is a simplified block diagram illustrating additional details that may be associated with video encoder 22. Video encoder 22 includes a processor 24c, memory 26c, a transform and quantization module 32, an entropy encoding module 34, an inverse transform and inverse quantization module 36, an intra/inter prediction module 38, a deblocking filter 40, and a reference buffer 44. Video encoder 22 is generally configured to receive image information (e.g., filtered image 84) as a signal via some connection, which may be a wireless connection, or via one or more cables or wires that allow for the propagation of signals. In an embodiment, an image can be processed in blocks or macroblocks of samples. In general, video encoder 22 may be configured to transform each block into a block of spatial frequency coefficients, divide each coefficient by an integer, and discard the remainder, such as in a transform and quantization module 32. The resulting coefficients can then be encoded using entropy encoding module 34.

Intra/inter prediction module 38 may be configured to enhance encoding, such as with motion compensation. A prediction can be formed based on previously encoded data, either from the current time frame (intra-prediction) or from other frames that have already been coded (inter-prediction). For example, inverse transform and inverse quantization module 36 can be configured to rescale the quantized transform coefficients. Each coefficient can be multiplied by an integer value to restore its original scale. An inverse transform can combine the standard basis patterns, weighted by the rescaled coefficients, to re-create each block of data. These blocks can be combined together to form a macroblock, and the prediction can be subtracted from the current macroblock to form a residual. In a video encoder with an in-loop filter, deblocking filter 40 can also be applied to blocks in decoded video to improve visual quality and prediction performance by smoothing the sharp edges that can form between macroblocks when block-coding techniques are used.

Figure 3:
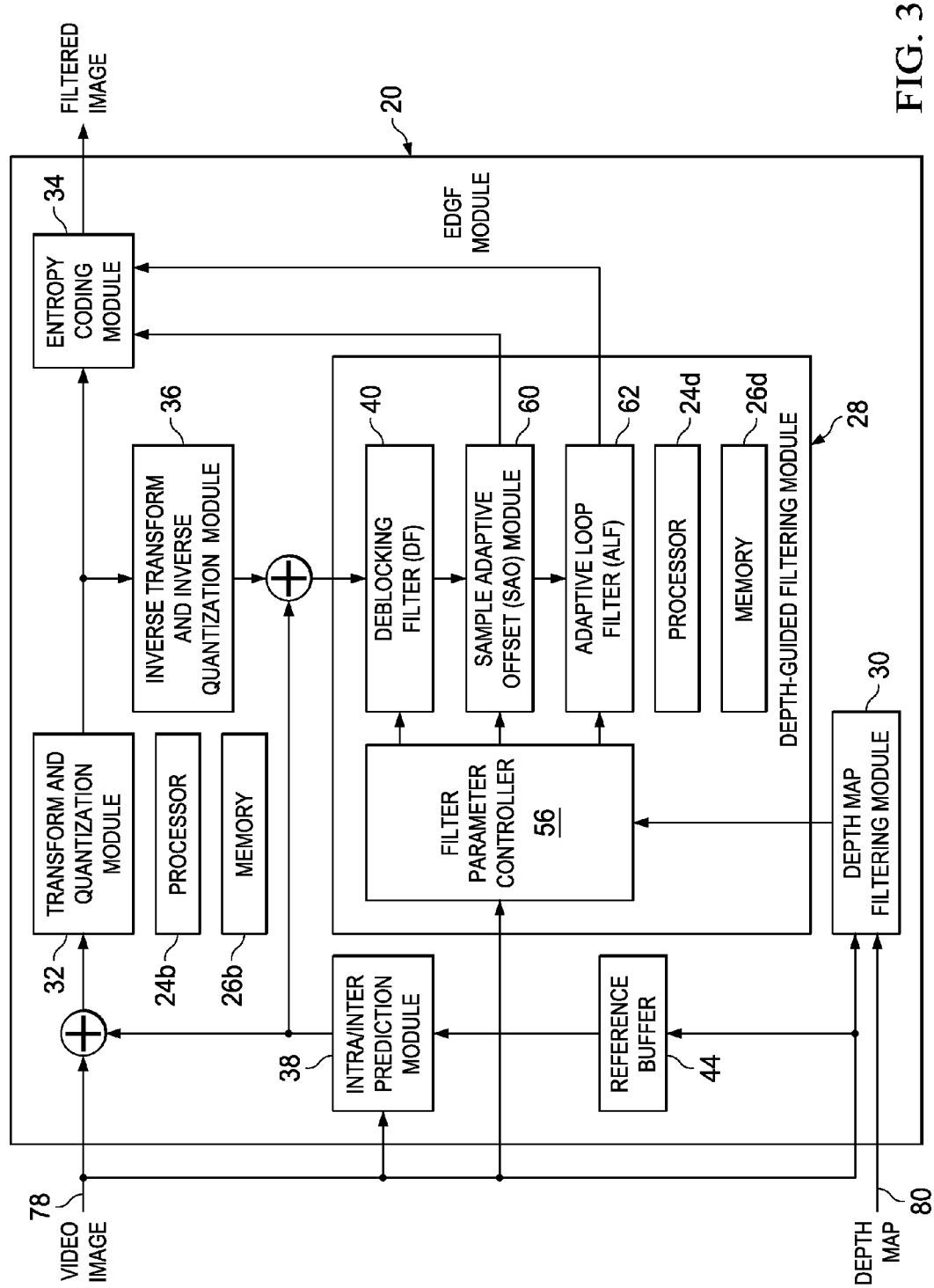
FIG. 3 is a simplified block diagram illustrating possible example details associated with one embodiment of the present disclosure.

Turning to FIG. 3, FIG. 3 is a simplified block diagram illustrating another embodiment of EDGF module 20. EDGF module 20 includes processor 24b, memory 26b, depth-guided filtering module 28, depth map filtering module 30, transform and quantization module 32, entropy coding module 34, inverse transform and inverse quantization module 36, intra/inter prediction module 38, and reference buffer 44. Depth-guided filtering module 28 includes a processor 24d, memory 26d, deblocking filter 40, filter parameter controller 56, sample adaptive offset module 60, and adaptive loop filter 62.

In an embodiment, EDGF module 20 can be configured for high efficiency video coding (HEVC) that includes depth-guided in-loop filtering, where a filtered depth map is sent to filter parameter controller 56. Based on depth values and available bit rates, filter parameter controller 56 can determine parameters for in-loop filters (e.g., deblocking filter 40, adaptive look filter 62, etc.) such that the subjective quality of video may be improved while the objective quality is preserved.

Figure 4:
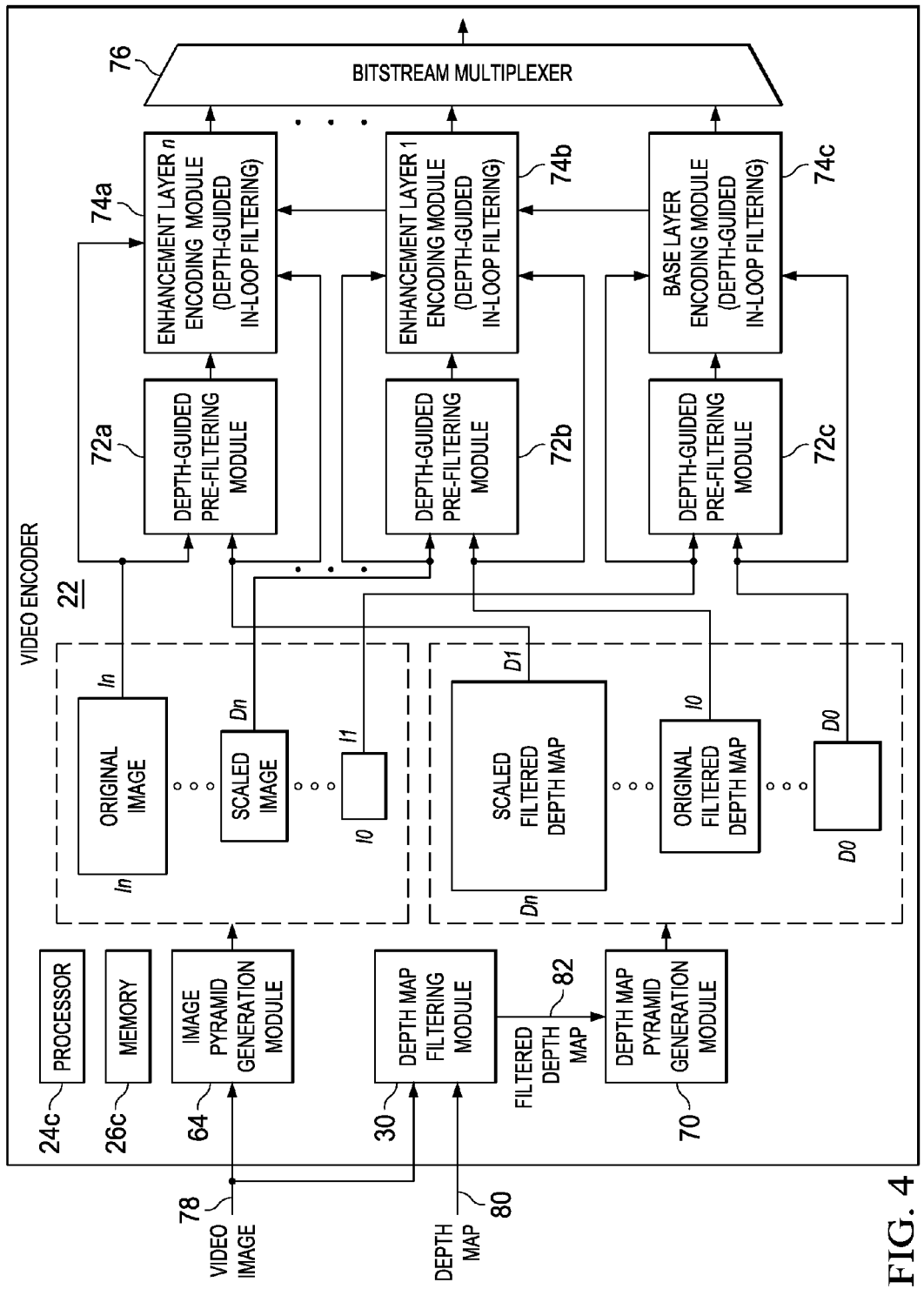
FIG. 4 is a simplified block diagram illustrating possible example details associated with one embodiment of the present disclosure.

Turning to FIG. 4, FIG. 4 is a simplified block diagram illustrating an embodiment of video encoder 22 having depth map filtering functionality. Video encoder 22 includes processor 24c, memory 26c, an image pyramid generation module 64, depth map filtering module 30, a depth map pyramid generation module 70, a plurality of depth-guided pre-filtering modules 72a-c, a plurality of layer encoding modules 74a-c, and a bitstream multiplexer 76. Video encoder 22 can be configured to incorporate both depth-guided pre-filtering and depth-guided in-loop filtering in a scalable video coding context.

In an embodiment, a hierarchical set of lower-resolution images is first generated from the original, high-resolution image. Next, the original depth map is filtered to generate a new depth map that has the same high resolution as the original image and at a higher quality. The new depth map is then downscaled to generate a hierarchical set of depth maps, each depth map corresponding to an image in the image hierarchical set. Finally, upon encoding, each video image is filtered using the corresponding depth map in the hierarchy.

More specifically, image pyramid generation module 64 can be configured to receive video image 78 and generate an original image signal and one or more scaled image signals. The original image signal and each of the one or more scaled image signals are sent to one of the plurality of depth-guided pre-filtering modules. For example, the original image signal may be sent to depth-guided pre-filtering module 72a, one scaled image signal may be sent to depth-guided pre-filtering module 72b, and a second scaled image signal may be sent to depth-guided pre-filtering module 72c.

Depth map pyramid generation module 70 can be configured to receive filtered depth map 82 from depth map filtering module 30 and generate a scaled filtered depth map signal and one or more original filtered depth map signals. The scaled filtered depth map signal and each of the one or more original filtered depth map signals are sent to one of the plurality of depth-guided pre-filtering modules. For example, the scaled filtered depth map signal may be sent to depth-guided pre-filtering module 72a, one original filtered depth map signal may be sent to depth-guided pre-filtering module 72b, and a second original filtered depth map signal may be sent to depth-guided pre-filtering module 72c.

Each depth-guided pre-filtering module combines the original image signal or one of the scaled image signals (which ever was received) and the scaled filtered depth map signal or one of the original filtered depth map signals (which ever was received) into a single signal that is sent to a corresponding layer encoding module 74a-c. For example, the original image signal and the scaled filtered depth map signal sent to depth-guided pre-filtering module 72a may be combined and sent to layer encoding module 74a. In another example, the scaled image signal and the original filtered depth map signal sent to depth-guided pre-filtering module 72b may be combined and sent to layer encoding module 74b. Each layer encoding module 74a-c processes the signal and sends the processed signal to bitstream multiplexer 76 where all the signals are combined.

Figure 5:
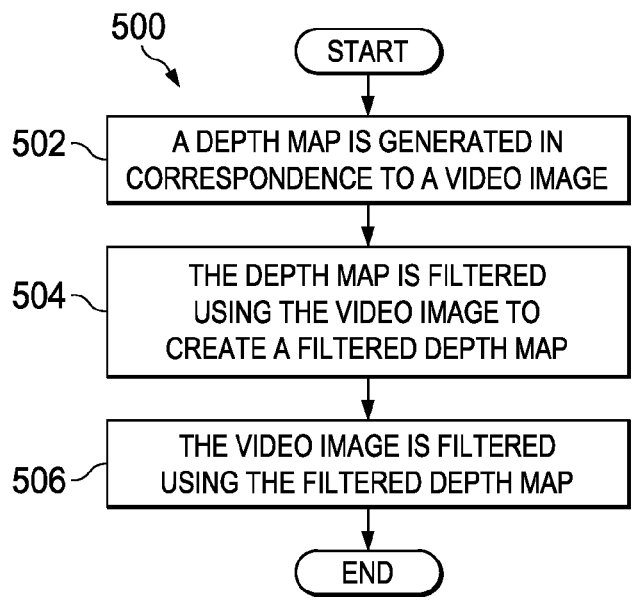
FIG. 5 is a simplified flowchart illustrating potential operations associated with the communication system in accordance with one embodiment of the present disclosure.

FIG. 5 is a simplified flowchart 500 illustrating example potential operations that may be associated with extended depth-guided filtering. At 502, a depth map is generated that corresponds to a video image. At 504, the depth map is filtered using the video image to create a filtered depth map. At 506, the video image is filtered using the filtered depth map.

Any of these elements (e.g., the network elements of FIG. 1 such as multipoint manager module 18, video encoder 22, etc.) can include memory elements for storing information to be used in achieving the extended depth-guided filtering activities as outlined herein. Additionally, each of these devices may include a processor that can execute software or an algorithm to perform the extended depth-guided filtering management activities as discussed in this Specification.

A processor can execute any type of instructions associated with the data to achieve the operations detailed herein in this Specification. In one example, processors (e.g., processor 24a, 24b) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machinereadable mediums suitable for storing electronic instructions, or any suitable combination thereof.

In operation, components in communication system 10 can include one or more memory elements (e.g., memory element 26a, 26b) for storing information to be used in achieving operations as outlined herein. This includes the memory element being able to store instructions (e.g., software, logic, code, etc.) in non-transitory media such that the instructions are executed to carry out the activities described in this Specification.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs.

The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Components of communication system 10 described and shown herein may also include suitable interfaces for receiving, transmitting, and/or otherwise communicating data or information in a network environment. Additionally, some of the processors and memories associated with the various components may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

The elements discussed herein may be configured to keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, table, cache, key, etc.) should be construed as being encompassed within the broad term "memory element." Similarly, any of the potential processing elements, modules, and machines described herein should be construed as being encompassed within the broad term "processor."

Note that with the examples provided above, interaction may be described in terms of two, three, or four elements or components. However, this has been done for purposes of clarity and example only. In certain cases, it may be easier to describe one or more of the functions or operations by only referencing a limited number of components. It should be appreciated that the principles described herein are readily scalable and can accommodate a large number of components, as well as more complicated/sophisticated arrangements and configurations. Accordingly, the examples provided should not limit the scope or inhibit the broad teachings provided herein as potentially applied to a myriad of other architectures. Additionally, although described with reference to particular scenarios, where a particular module is provided within an element, these modules can be provided externally, or consolidated and/or combined in any suitable fashion. In certain instances, such modules may be provided in a single proprietary unit.

It is also important to note that operations in the appended diagrams illustrate only some of the possible scenarios and patterns that may be executed by, or within elements of communication system 10. Some of these operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings provided herein.

Although a system and method for depth-guided image filtering has been described in detail with reference to particular embodiments, it should be understood that various other changes, substitutions, and alterations may be made hereto without departing from the spirit and scope of this disclosure. For example, although the previous discussions have focused on video conferencing associated with particular types of endpoints, handheld devices that employ video applications could readily adopt the teachings of the present disclosure. For example, iPhones, iPads, Android devices, personal computing applications (i.e., desktop video solutions, Skype, etc.) can readily adopt and use the depth-guided filtering operations detailed above. Any communication system or device that encodes video data would be amenable to the features discussed herein.

It is also imperative to note that the systems and methods described herein can be used in any type of imaging or video application. This can include standard video rate transmissions, adaptive bit rate (ABR), variable bit rate (VBR), CBR, or any other imaging technology in which image encoding can be utilized. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
generating a depth map that corresponds to a video image;
filtering the depth map with the video image to create a filtered depth map, wherein filtering the depth map includes filling in missing data from the depth map and upsampling when the depth map has a lower resolution than the video image, wherein the video image is a higher resolution image than the depth map, wherein details of objects closer to a viewpoint are preserved preferentially over objects further away;
using the video image to create a pyramid of video images; and
using the depth map to create a pyramid of depth maps, wherein the pyramid of video images are filtered with the pyramid of depth maps, layered into multiple bit streams, and cascaded to create an image.

2. The method of claim 1, wherein the filtering the depth map and filtering the video image are performed sequentially.

3. The method of claim 1, further comprising:
using extended depth-guided filtering that is incorporated into a video encoding-decoding loop, and wherein filtering the depth map includes removing noise from the depth map.

4. The method of claim 1, wherein zero-mean Gaussian function with standard deviations are used for filtering the depth map.

5. The method of claim 1, further comprising:
encoding the multiple bit streams for transmission over a network.

6. The method of claim 5, wherein encoding the multiple bit streams includes using a deblocking filter in H.264.

7. Logic encoded in non-transitory media that includes instructions for execution and when executed by a processor, is operable to perform operations comprising:
generating a depth map that corresponds to a video image, wherein the video image is filtered;
filtering the depth map with the video image to create a filtered depth map, wherein filtering the depth map includes filling in missing data from the depth map and upsampling when the depth map has a lower resolution than the video image, wherein the video image is a higher resolution image than the depth map, wherein details of objects closer to a viewpoint are preserved preferentially over objects further away;
using the video image to create a pyramid of video images; and
using the depth map to create a pyramid of depth maps, wherein the pyramid of video images are filtered with the pyramid of depth maps, layered into multiple bit streams, and cascaded to create an image.

8. The logic of claim 7, the operations further comprising:
encoding the multiple bit streams for transmission over a network.

9. An apparatus, comprising:
a memory element for storing data;
a processor that executes instructions associated with the data;
a manager module configured to interface with the processor and the memory element such that the apparatus is configured to:
generate a depth map that corresponds to a video image, wherein the video image is filtered;
filter the depth map with the video image to create a filtered depth map, wherein filtering the depth map includes filling in missing data from the depth map and upsampling when the depth map has a lower resolution than the video image, wherein the video image is a higher resolution image than the depth map, wherein details of objects closer to a viewpoint are preserved preferentially over objects further away;
using the video image to create a pyramid of video images; and
using the depth map to create a pyramid of depth maps, wherein the pyramid of video images are filtered with the pyramid of depth maps, layered into multiple bit streams, and cascaded to create an image.

* * * * *